United States Patent [19]

Rosenquist

[11] Patent Number: 4,579,896
[45] Date of Patent: Apr. 1, 1986

[54] FLAME RETARDANT POLYCARBONATE COMPOSITIONS

[75] Inventor: Niles R. Rosenquist, Evansville, Ind.

[73] Assignee: General Electric Company, Mt. Vernon, Ind.

[21] Appl. No.: 688,247

[22] Filed: Jan. 2, 1985

[51] Int. Cl.$^4$ .................... C08K 3/16; C08K 5/03; C08K 5/15

[52] U.S. Cl. .................... 524/108; 524/161; 524/162; 524/163; 524/348; 524/394; 524/401; 524/430; 524/436; 524/464; 524/539

[58] Field of Search ............... 260/DIG. 24; 524/108, 524/401, 539, 161, 162, 163, 394, 430, 464; 549/348

[56] References Cited

U.S. PATENT DOCUMENTS 4,407,995 10/1983 Dick ..................................... 524/108
4,409,349 10/1983 Hans ..................................... 524/108

Primary Examiner—Harold D. Anderson
Assistant Examiner—Kriellion S. Morgan
Attorney, Agent, or Firm—Myron B. Kapustij; Martin B. Barancik

[57] ABSTRACT

Flame retardant and drip retardant polycarbonate composition comprised of:
(i) at least one aromatic carbonate resin;
(ii) a flame retardant amount of at least one flame retardant compound; and
(iii) a drip retardant amount of at least one bis cyclic carbonate represented by the general formula

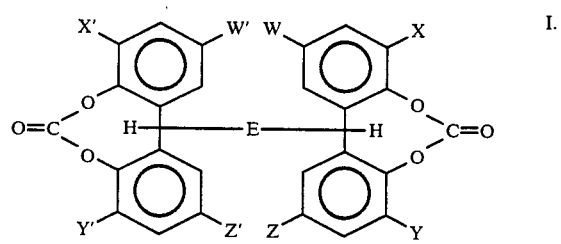

wherein X, Y, X' and Y' are the same or different and are hydrogen or alkyl of one to about six carbon atoms, inclusive; W, W', Z and Z' are the same or different and are alkyl of one to about six carbon atoms, inclusive, and E is alkylene or alkylidene of two to about twelve carbon atoms, inclusive.

20 Claims, No Drawings

FLAME RETARDANT POLYCARBONATE COMPOSITIONS

Polycarbonates are well known polymers which exhibit many advantageous properties. They possess, for example, excellent properties of impact strength, dimensional stability, optical clarity, and the like. Due to these many excellent mechanical properties the polycarbonates are utilized as plastic engineering materials. However, like plastics in general, the polycarbonates are rather flammable.

It is well known in the art that polycarbonates may be rendered flame retardant by the use of conventional flame retardants. While these conventional flame retardant polycarbonates are quite useful in many areas, there are some applications wherein an even greater degree of flame retardancy is required. This is particularly the case when dealing with rather thin polycarbonate articles, e.g., less than about 125 mils thick. These thin polycarbonate articles are very prone to the dripping of flaming particles, thereby making it very difficult for them to meet certain flame retardant standards such as, for example, those of Underwriter's Laboratories UL-94. This problem of dripping flaming particles, or drip, has been addressed by the use, in addition to the conventional flame retardant agents, of various types of drip retardants or drip inhibitors. However, many of these drip retardants are, to a certain degree, incompatible with polycarbonates and when used in quantities sufficient to render the polycarbonates drip retardant adversely affect the properties, such as optical clarity and surface appearance, of the polycarbonates. There thus exists a need for drip retardants which are compatible with polycarbonates.

It is an object of this invention to provide flame and drip retardant polycarbonate compositions.

SUMMARY OF THE INVENTION

The instant invention is directed to flame retardant polycarbonate compositions comprised of:
(i) at least one high molecular weight aromatic polycarbonate; and
(ii) an amount effective to render said polycarbonate flame and drip retardant of
  (a) at least one known flame retardant agent, and
  (b) at least one bis cyclic carbonate.

DESCRIPTION OF THE INVENTION

It has now been discovered that the flame retardancy of polycarbonates rendered flame retardant by conventional flame retardant agents can be improved by the use of certain bis cyclic carbonates. More particularly, polycarbonate compositions are provided which are flame retardant and drip retardant comprising:
(i) at least one aromatic polycarbonate resin; and
(ii) an amount effective to render said polycarbonate flame retardant and drip retardant of
  (a) at least one known flame retardant agent, and
  (b) at least one bis cyclic carbonate.

The aromatic polycarbonate resins suitable for use herein as component (a) may be prepared by reacting a dihydric phenol with a carbonate precursor, such as phosgene, a haloformate or a carbonate ester. Typically, such carbonate polymers are represented as comprising recurring structural units of the formula:

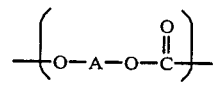

wherein A is a divalent aromatic radical of the dihydric phenol employed in the polymer producing reaction. Preferably, the carbonate polymers used to provide the resinous mixtures of the invention have an intrinsic viscosity (as measured in methylene chloride at 25° C.) ranging from about 0.30 to about 1.00 dl/g. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are:

2,2-bis-(4-hydroxyphenyl)propane;
hydroquinone;
resorcinol;
2,2-bis-(4-hydroxyphenyl)pentane;
2,4'-(dihydroxydiphenyl)methane;
bis-(2-hydroxyphenyl)methane;
bis-(4-hydroxyphenyl)methane;
bis-(4-hydroxy-5-nitrophenyl)methane;
1,1-bis(4-hydroxyphenyl)ethane;
3,3-bis(4-hydroxyphenyl)pentane;
2,2-dihydroxydiphenyl;
2,6-dihydroxynaphthalene;
bis-(4-hydroxydiphenyl)sulfone;
bis-(3,5-diethyl-4-hydroxyphenyl)sulfone;
2,2-bis-(3,5-dimethyl-4-hydroxyphenyl)propane;
2,4'-dihydroxydiphenyl sulfone;
5'-chloro-2,4'-dihydroxydiphenyl sulfone;
bis-(4-hydroxyphenyl)diphenyl sulfone;
4'4'-dihydroxydiphenyl ether;
4,4'-dihydroxy-3,3'-dichlorodiphenyl ether;
4,4'-dihydroxy-2,5-dihydroxydiphenyl ether;
and the like.

Other dihydric phenols which are also suitable for use in the preparation of the above polycarbonates are disclosed in U.S. Pat. Nos. 2,999,835; 3,038,365; 3,334,154 and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature and U.S. Pat. Nos. 4,018,750 and 4,123,426, or by transesterification processes such as are disclosed in U.S. Pat. No. 3,153,008, as well as other processes known to those skilled in the art.

It is possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired for use in the preparation of the polycarbonate mixtures of the invention. Branched polycarbonates are also useful, such as are described in U.S. Pat. No. 4,001,184. Also there can be utilized blends of a linear polycarbonate and a branched polycarbonate. Moreover, blends of any of the above materials may be employed in the practice of this invention to provide the aromatic polycarbonate. In any event, the preferred aromatic carbonate polymer for use as component (a)

herein is a homopolymer derived from 2,2-bis(4-hydroxyphenyl)propane (bisphenol-A).

The flame retardant compounds which are admixed with the polycarbonate resin are conventional well known compounds that positively upgrade the flame retardancy of polycarbonates.

Some particularly useful flame retardants are the alkali and alkaline earth metal salts of organic sulfonic acids. These types of flame retardants are disclosed, inter alia, in U.S. Pat. Nos. 3,933,734; 3,948,851; 3,926,908; 3,919,167; 3,909,490; 3,953,396; 3,931,100; 3,978,024; 3,953,399; 3,917,559; 3,951,810; 3,940,366; 3,775,367 and 3,836,490, all of which are hereby incorporated by reference.

These flame retardant additives are present in the instant polycarbonate compositions in a flame retardant amount. By flame retardant amount is meant an amount effective to render said compositions flame retardant. Generally, this amount is in the range of from about 0.01 to about 10 parts by weight of the salt per hundred parts by weight of the resin, preferably from about 0.1 to about 5 parts by weight of the salt per hundred parts by weight of the resin.

Some particularly useful alkali and alkaline earth metal salts of organic sulfonic acids include sodium 2,4,5-trichlorobenzenesulfonate; sodium benzenesulfonate; disodium naphthalene-2,6-disulfonate; sodium p-iodobenzenesulfonate; sodium 4,4'-dibromobiphenyl-3-sulfonate; sodium 2,3,4,5,6-pentachloro-betastyrenesulfonate; sodium 4,4'-dichlorodiphenylsulfide-3-sulfonate; disodium tetrachlorodiphenyletherdisulfonate; disodium 4,4'-dichlorobenzophenone-3,3'-disulfonate; sodium 2,5-dichlorothiophene-3-sulfonate; sodium salt of diphenylsulfone-3-sulfonic acid; sodium dimethyl 2,4,6-trichloro-5-sulfoisophthalate; potassium salt of the sulfonic acid of dichlorophenyl 2,4,5-trichlorobenzene sulfonate; calcium salt of 2,4,5-trichlorobenzenesulfonanilide-4'-sulfonate; sodium 4'[1,4,5,6,7,7-hexachlorobicyclo-[2.2.1]-hept-5-en-endo-2-yl]-benzenesulfonate; disodium hexafluoroglutarate; disodium chloranilate; sodium perfluoroalkylsulfonate wherein alkyl is butyl or octyl and mixtures thereof.

Conventional well known flame retardants other than the aforementioned salts may also be employed in the practice of this invention. These conventional flame retardant additives generally contain a halogen, preferably chlorine and/or bromine. That is to say, they are a halogen source. They may be inorganic or organic. Typical of the inorganic halogen sources are NaCl, KBr, etc. The organic halogen sources are preferably aromatic and may be either monomers or polymers. Typical aromatic monomers include the halodiphenyl ethers such as tetrabromodiphenyl ether, etc. Typical aromatic polymers include those derived from halogenated bisphenols such as, for example, a polycarbonate derived from tetrabromobisphenol-A or a carbonate copolymer derived from tetrabrombisphenol-A and bis-phenol-A. These flame retardant additives are present in the instant compositions in a flame retardant amount. By flame retardant amount is meant an amount effective to render said compositions flame retardant. Generally this amount is such as to provide a composition having a halogen content of from about 0.01 to about 10 weight percent, based on the total weight of the composition, preferably from about 0.1 to about 5 weight percent.

The compositions of this invention may be prepared in the usual manner, for example by blending the resin with the flame retardant additive in dry form such as powder or granules and then extruding.

The bis cyclic carbonate, which acts as the drip retardant agent or drip inhibitor, is a compound represented by the general formula

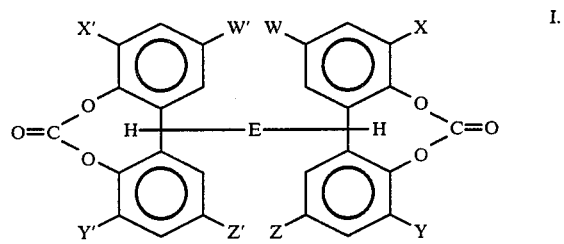

wherein X, Y, X' and Y' are the same or different and are hydrogen or alkyl of one to about six carbon atoms, inclusive; W, W', Z and Z' are the same or different and are alkyl of one to about six carbon atoms, inclusive, and E is alkylene or alkylidene or alkylidene of two to about twelve carbon atoms, inclusive.

Alkyl of one to six carbon atoms, includes normal and branched alkyl, i.e. methyl, ethyl, propyl, butyl, pentyl, hexyl, isopropyl, isobutyl, tert.butyl, neopentyl and 2,3-dimethylbutyl and the like. Normal alkyl are preferred. Alkyl of one to three carbon atoms are also preferred. Alkylene of two to twelve carbon atoms, inclusive include normal and branched such as ethylene, propylene, butylene, isobutylene, 2,3-dimethylbutylene, hexylene, dodecylene and the like. Alkylidene include isopropylidene, 3,3-decylidene and the like. Alkylene and alkylidene of 2 to 6 carbon atoms are preferred.

The bis cyclic carbonate, as well as their preparation, are disclosed in copending U.S. patent application Ser. No. 688,244 of Rosenquist, assigned to the same assignee as the instant application and filed on the same day.

The bis cyclic carbonates of Formula I are readily prepared from tetraphenols represented by the general formula

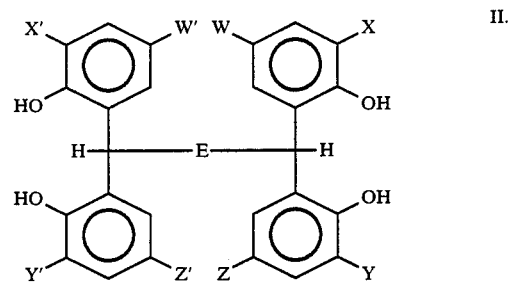

wherein X, X', Y, Y', W, W', Z, Z' and E are the same as defined hereinafore.

The instant bis cyclic carbonates of Formula I are prepared from the tetraphenols of Formula II under standard conditions. For example the standard method of interfacially preparing polycarbonate is also applicable to preparing the bis cyclic carbonates, that is, the use of aqueous caustic, methylene chloride, phosgene, and triethylamine. Alternatively, the addition of a pyridene/methylene chloride solution of the tetraphenol to phosgene in methylene chloride can be employed. Standard work-up conditions such as washing and solvent removal yields a solid from which product is isolated by addition of an appropriate solvent such as toluene. Product precipitates therefrom. Raising the temperature to the reflux temperature of the pyridine/methylene chloride system improved the yield. When toluene is used as a solvent with a reaction temperature of 85° C., the reaction rate is accelerated substantially.

The amount of the bis cyclic carbonates of Formula I employed is a drip retardant amount. By drip retardant amount is meant an amount that is effective to inhibit or retard dripping of polycarbonate resins. That is to say, an amount which when used in conjunction with the flame retardant components described hereinafore is effective to render said polycarbonate resins flame retardant and drip retardant. Generally the amount is in the range of from about 0.1 to about 10 parts by weight of the bis cyclic carbonate per 100 parts by weight of polycarbonate resin, preferably from about 0.5 to about 8 parts by weight of the bis cyclic carbonate per 100 parts by weight of polycarbonate resin, and more preferably from about 1 to about 5 parts by weight of bis cyclic carbonate per 100 parts by weight of polycarbonate resin.

It is to be understood that mixtures of two or more different bis cyclic carbonates as well as individual bis cyclic carbonates can be used in the compositions of the instant invention.

Although not necessary to show increased flame and drip retardance, it is sometimes beneficial to the retardancy to also have present in the polycarbonate composition catalytic quantities of a transesterification catalyst. Such catalysts are the same as those known to catalyze the preparation of polycarbonate in melt reaction conditions. These catalysts are of the basic type, for example oxides, hydrides, hydroxides or amides of the alkali or alkaline earth metals as well as basic metal oxides such as lithium stearate and organotitanium, organoaluminums and organotins such as tetraoctyltitanate. Lithium hydroxide is preferred.

The compositions of the instant invention may also optionally contain other commonly known and used additives such as ultraviolet radiation absorbers such as the benzophenones, benzotriazoles, cyanoacrylates, and the like; hydrolytic stabilizers such as the epoxides disclosed in U.S. Pat. Nos. 3,489,716, 4,138,379 and 3,839,247, all of which are incorporated herein by reference; and color stabilizers such as the organophosphites disclosed in U.S. Pat. Nos. 3,305,520 and 4,118,370, both of which are incorporated herein by referene.

DESCRIPTION OF THE PREFERRED EMBODIMENT

The following examples are set forth to illustrate more clearly the principle and practice of this invention to those skilled in the art. Unless otherwise specified, where parts or percents are mentioned, they are parts or percents by weight.

The following Examples illustrate polycarbonate compositions falling outside the usage of the instant invention in that they do not contain any of the bis cyclic carbonate drip retardant of the instant invention.

EXAMPLE 1

A polycarbonate composition is prepared by extruding a homopolymer of 2,2-bis(4-hydroxyphenyl) propane (hereinafter referred to as bisphenol-A) prepared by reacting essentially equimolar amounts of bisphenol-A and phosgene in an organic medium with triethylamine, sodium hydroxide, and phenol, under standard conditions. The resulting polymer is then fed to an extruder, which extruder is operated at about 265° C., and the extrudate is comminuted into pellets.

The pellets are then injection molded at about 315° C. into test bars of about 2½"×½" by about ⅛" thick. The test bars are subjected to the test procedure set forth in Underwriters' Laboratories, Inc. Bulletin 94, Burning test for Classifying Materials (hereinafter referred to as UL-94). In accordance with this test procedure, materials so investigated are rated either UL-94 V-O, UL-94 V-I, UL-94 V-II, based on the results of 5 specimens. The criteria for each V rating per UL-94 is briefly as follows:

"UL-94 V-O": Average flaming and/or glowing after removal of the igniting flame shall not exceed 5 seconds, and none of the specimens shall drip particles which ignite absorbent cotton.

"UL-94 V-I": Average flaming and/or glowing after removal of the igniting flame shall not exceed 25 seconds and none of the specimens shall drip particles which ignite absorbent cotton.

"UL-94 V-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burning". Further, UL-94 requires that all test bars must meet the V type rating to achieve the particular rating. Otherwise, the 5 bars receive the rating of the worst single bar. For example, if one bar is classified as UL-94 V-II and the other four (4) are classified as UL-94 V-O, then the rating for all 5 bars is UL-94 V-II.

The results are shown in Table I.

EXAMPLE 2

To 100 parts by weight of the polycarbonate of Example 1 is added 0.6 parts by weight of sodium 2,4,5-trichlorobenzenesulfonate. The mixture is extruded, molded into test bars having a thickness of 90 mils and tested in the same manner as described in Example 1.

EXAMPLE 3

To 100 parts by weight of the polycarbonate of Example 1 are added 0.6 parts by weight of sodium 2,4,5-trichlorobenzenesulfonate and 5.5 parts per million of LiOH. The mixture is extruded, molded into test bars having a thickness of 90 mils, and tested in the same manner as described in Example 1.

EXAMPLE 4

To 976.8 grams of the polycarbonate of Example 1 are added 232.2 grams of a carbonate copolymer derived from 1,1-bis(3,5-dibromo-4 hydroxyphenyl)propane and 1,1-bis(4-hydroxyphenyl)propane (4.2% Br content). The mixture is extruded, molded into test bars of about 2½"×½"×⅛" thick, and tested in the same manner as described in Example 1.

The following Examples illustrate the composition of the instant invention.

EXAMPLE 5

To 100 parts by weight of the polycarbonates of Example 1 are added 0.6 parts by weight of sodium 2,4,5-trichlorobenzenesulfonate, 5.5 parts per million g LiOH, and 1.1 parts by weight of a tetramethyl bis cyclic carbonate where W=Z=W'=Z'=methyl; X=Y=X'=Y'=hydrogen, E is propylene. The mixture is extruded, molded into test bars having a thickness of 90 mils, and tested in the same manner as described in Example 1.

EXAMPLE 6

To 976.8 grams of the polycarbonate of Example 1 are added 232.2 grams of a carbonate copolymer derived from 1,1-bis(3,5-dibromo-4-hydroxyphenyl)propane and 1,1-bis(4-hydroxyphenyl)propane (4.2% Br), and 1.18 parts by weight per 100 parts by weight of polycarbonate resin of an octamethyl bis cyclic carbonate where W=Z=W'=Z'=X=Y=X'=Y'=methyl, E is propylene. This mixture is extruded, molded into test bars of about 2½"×½"×⅛" thick, and tested in the same manner as described in Example 1.

TABLE I

| EXAMPLE NO. | FLAMMABILITY RATING |
| --- | --- |
| 1 | burns |
| 2 | V-II |
| 3 | V-II |
| 4 | V-II |
| 5 | V-O |
| 6 | V-O |

As illustrated by the data in Table I the Examples containing a flame retardant additive but no bis cyclic carbonate (Examples 2-4) inhibit a certain degree of flame retardancy but nevertheless also exhibit dripping. On the other hand, when the bis cyclic carbonate of the instant invention is used in conjunction with the flame retardant additives of these Examples (Examples 5 and 6) they exhibit drip retardant characteristics.

EXAMPLE 7

To 100 parts by weight of the polycarbonate of Example 1 is added 0.6 parts of the flame retardant of Example 5. The mixture is extruded, molded into test bars of 1/16" thickness and tested in the same manner as Example 1. Each of the five test bars had at least one flaming drip and had an average flame out time of 3.9 seconds and a range of flame out time of 1.2 to 11.6 seconds.

EXAMPLE 8

To the composition of Example 7 prior to extrusion was added 1.1 parts per hundred of the tetramethyl biscyclic carbonate of Example 5. Only three of the five test bars had at least one flaming drip. The average flame out time was 1.9 seconds with a range of flame out time from 0.1 to 4.3 seconds.

What is claimed is:

1. A flame retardant and drip retardant polycarbonate composition comprised of:
   (i) at least one aromatic carbonate resin;
   (ii) at least one flame retardant agent selected from the alkali metal salts of organic sulfonic acids, the alkaline earth metal salts of organic sulfonic acids, or a halogen source selected from the inorganic halogen salts or organic aromatic halogen containing compounds; and
   (iii) a drip retardant effective amount of at least one bis cyclic carbonate represented by the formula

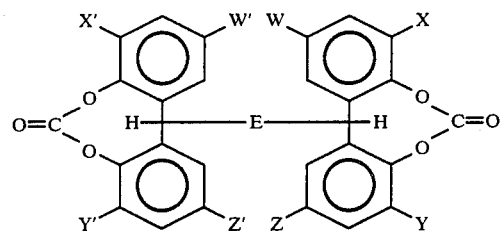

wherein X, Y, X' and Y' are independently selected from hydrogen or alkyl radicals of one to about six carbon atoms, W, W', Z and Z' are independently selected from alkyl radicals of one to about six carbon atoms, and E is selected from alkylene or alkylidene radicals of two to about 12 carbon atoms.

2. The composition of claim 1 wherein X, Y, X' and Y' are hydrogen, and W, Z, W' and Z' are methyl.
3. The composition of claim 1 wherein W, X, Y, Z, W', X', Y' and Z' are methyl.
4. The composition of claim 2 wherein E is selected from alkylene and alkylidene radicals of from 2 to 6 carbon atoms.
5. The composition of claim 4 wherein E is a normal alkylene containing three carbon atoms.
6. The composition of claim 2 wherein E is a normal alkylene of three carbon atoms.
7. The composition of claim 3 wherein E is a normal alkylene of three carbon atoms.
8. The composition of claim 1 which contains a flame retardant effective amount of said flame retardant compound.
9. The composition of claim 8 which contain from about 0.1 to about 10 parts by weight per 100 parts by weight of said aromatic carbonate resin of said bis cyclic carbonate.
10. The composition of claim 9 which contains from about 0.5 to about 8 parts by weight per 100 parts by weight of said aromatic carbonate resin of said bis cyclic carbonate.
11. The composition of claim 10 which contains from about 1 to about 5 parts by weight per 100 parts by weight of said aromatic carbonate resin of said bis cyclic carbonate.
12. The composition of claim 9 which contains from about 0.01 to about 10 parts by weight of said salt per 100 parts by weight of said carbonate resin.
13. The composition of claim 12 which contains from about 0.1 to about 5 parts of said salt per 100 parts by weight of said carbonate resin.
14. The composition of claim 9 wherein said halogen source is effective to provide a composition having a halogen content of from about 0.01 to about 10 weight percent.
15. The composition of claim 14 wherein said halogen source is effective to provide a composition having a halogen content of from about 0.1 to about 5 weight percent.
16. The composition of claim 14 wherein said halogen source is a carbonate polymer derived from at least one dihydric phenol containing at least one halogen substituent in at least one aromatic ring.
17. The composition of claim said halogen source is a carbonate polymer derived from 1,1-bis-(3,5-dibromo-4-hydroxyphenyl)propane.
18. The composition of claim 17 wherein said halogen source is a carbonate copolymer derived from 1,1-bis(3,5-dibromo-4-hydroxyphenyl)propane and 1,1-bis(4-hydroxyphenyl)propane.
19. The composition of claim 1 wherein a carbonate forming catalytically effective amount of a conventional transesterification catalyst selected from basic metal transesterification catalysts is present in the composition.
20. The composition of claim 19 wherein the catalyst is lithium hydroxide.